Sept. 15, 1953

E. L. CROSBY, JR 2,652,447

SOUND SEPARATION MEANS FOR CARRIER FREQUENCY DIFFERENCE TELEVISION RECEIVERS

Filed Jan. 19, 1949

Inventor
EDWARD L. CROSBY, JR.

By Killman and Kerst
Attorney

Patented Sept. 15, 1953

2,652,447

UNITED STATES PATENT OFFICE 2,652,447

SOUND SEPARATION MEANS FOR CARRIER FREQUENCY DIFFERENCE TELEVISION RECEIVERS

Edward L. Crosby, Jr., Baltimore, Md., assignor to Bendix Aviation Corporation, Towson, Md., a corporation of Delaware Application January 19, 1949, Serial No. 71,745

5 Claims. (Cl. 178—5.8)

Figure 1:
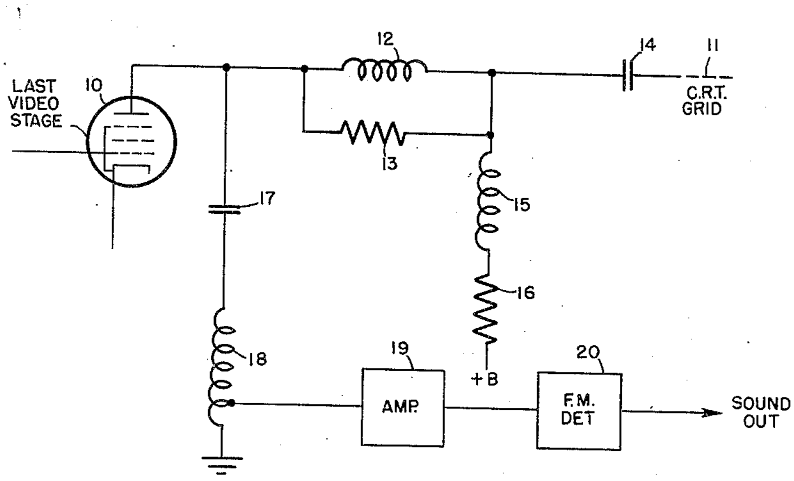

This invention relates to sound separation means for television receivers of the type wherein both the picture and sound carriers, after being heterodyned, are passed through a single I. F. channel. Both I. F. carriers are amplitude detected in the second detector and combined therein to produce an output containing the video frequencies and a beat frequency carrier having a frequency equal to the separation of the initial carriers and bearing the frequency modulation of the sound signal. The output of the second detector is fed to a video amplifier chain.

In previous forms of this system the video chain fed the picture tube grid, and sound separation was accomplished by a series resonant circuit connected in shunt with a high impedance video interstage coupling network, and supplying an isolation amplifier stage and through it an FM detector circuit and sound A. F. channel.

This means of sound separation possessed certain disadvantages and defects. The series resonant circuit used to couple sound I. F. components out of the video channel added capacity to the video coupling means, reducing the gain-band width product of the video chain and complicating the peaking problem. In addition, since a small value of coupling capacitance was used in the series resonant circuit, it was necessary to tap down the coil with a resulting coupling loss in the sound channel which must be made up by increased amplification. The less the coupling loss introduced in the sound channel the more the video output was degraded and the worse was the elimination of sound from the picture signal.

It is an object of the present invention to provide a simple sound separation means which overcomes the above mentioned defects.

It is a further object of this invention to provide a sound separation circuit which will act as a trap for the sound in the video circuit thus improving the elimination of sound from that circuit.

The above and other objects and advantages of the invention are realized by a circuit in which a parallel resonant circuit is placed in series with the cathode of the final video stage, the coil of the parallel resonant circuit forming the primary of the discriminator transformer of the frequency demodulation means of the audio channel. The resonant circuit is tuned to the best frequency carrier which bears the sound modulation.

In the drawings:

Fig. 1 is a schematic circuit diagram illustrating the previously known system of sound separation discussed above, and Fig. 2 is a schematic circuit diagram illustrating a sound separation circuit embodying the instant invention.

Referring more particularly to the drawings there is shown in Fig. 1 a pentode tube 10 constituting the last stage of the video chain of a television receiver. The output of this tube is applied by way of a coupling network to the control grid 11 of a cathode ray tube which constitutes the picture tube of the television receiver. The coupling network shown comprises a coil 12 and a resistor 13 in parallel, this combination being connected in series with a blocking condenser 14 between the anode of tube 10 and the grid 11. A coil 15 and a resistor 16 are serially connected between the junction of coil 12 and condenser 14 and a source of plate supply voltage.

The coil 12 is tuned to be self-resonant at the 4.5 megacycle carrier separation frequency thus serving to block the application of this frequency to the picture tube. At the video frequencies its impedance is low and it contributes to the desired peaking action at those frequencies. The coil 15 is self-resonant at the video frequencies to assist in the peaking effect.

Connected between the anode of tube 10 and ground is a series circuit including a coupling condenser 17 and a coil 18. An amplifier 19 and an FM detector 20 are serially connected to a tapped-down point on the coil 18. The condenser 17 has a low value and is series resonant with the coil 18 at the 4.5 megacycle frequency.

In operation the combination 17, 18 selectively applies the 4.5 carrier resulting from the beating of the I. F. carriers in the second detector to the amplifier 19 and the frequency modulation detector 20 in which the audio modulation envelope is derived and applied to the loudspeaker of the receiver. The coupling network including the coils 12 and 15 acts to selectively apply the video frequencies to the picture tube. This circuit is subject to the shortcomings previously pointed out.

Figure 2:
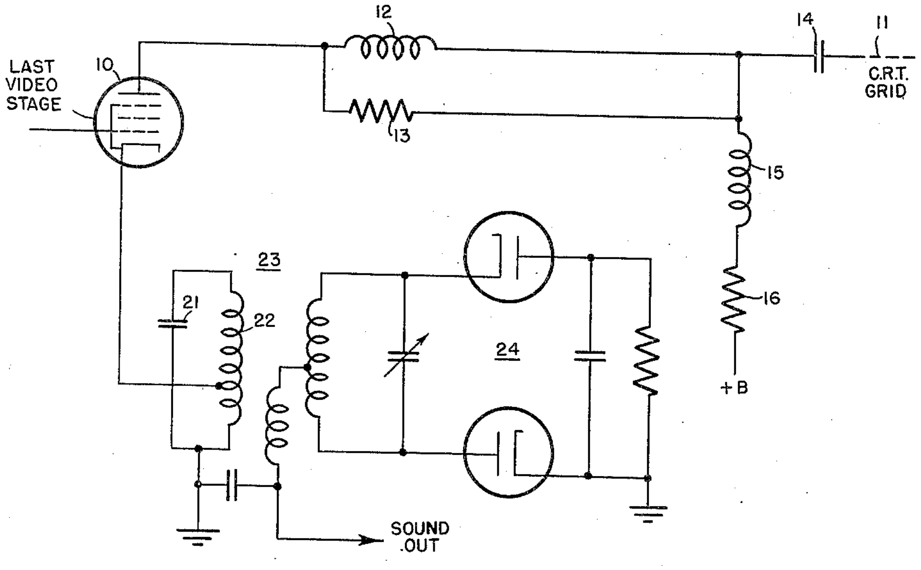

The circuit embodying the present invention which is illustrated in Fig. 2 does not employ the series resonant circuit 17, 18 but in its stead a parallel resonant circuit composed of condenser 21 and coil 22 is connected between the cathode of tube 10 and ground, the cathode lead being tapped down on the coil 22. The coil 22 forms the primary of the discriminator transformer 23 which couples a conventional ratio detector circuit 24 to the cathode circuit of tube 10. The parallel resonant circuit 21, 22 is tuned to the 4.5 megacycle carrier separation frequency which bears the sound modulation.

The tapping down of the cathode lead on the coil 22 is advisable for the following reasons:

The parallel resonant circuit in the video amplifier cathode circuit is highest in impedance at its resonant frequency, which is 4.5 megacycles. The effective operating Q of this circuit determines the magnitude of sound recovery and the band-width of the recovered sound.

As far as the video is concerned, the parallel resonant circuit in the cathode circuit of tube 10 causes the tube to be very degenerative at the signal (in this case, video) frequencies. The gain of such a stage is generally given as $$\frac{Gm\ Rp\ Eg}{1+Gm\ Rk}$$

Where:

Gm is the transconductance of the tube,
Rp is the plate resistance,
Eg is the grid voltage, and
Rk is the cathode resistance.

Assuming Rk to be limited by Q $$Z=\frac{Q}{\omega C}$$

For a 10μμf. tuning condenser across the coil at 4.5 mc. Z=approximately .25 megohm for a coil Q of 100. All of these values are of practical magnitude.

Unfortunately, with the entire coil in series with the cathode of tube 10, the impedance to ground of the latter shunts the coil and greatly reduces its effective Q. This difficulty is overcome by bringing the cathode lead to a tap on the coil near its ground end.

It can be seen that since the FM detector primary has a high impedance at the sound carrier center frequency it will effectively function as a trap for the sound in the video, depending on its effective Q. This is limited by the loading reflected by the detector diodes, which needs not be excessive. It is also evident that no additional capacity is introduced into the video coupling. Furthermore, since the sound detector is fed at the point of highest level in the video chain, no further amplification prior to detection is necessary, particularly since two stages of audio frequency amplification will follow the detector.

What is claimed is:

1. In a television receiver for receiving television signals consisting of an amplitude modulated video signal carrier and a related frequency modulated audio signal carrier, the two carriers being separated by a substantially fixed frequency difference, said receiver including means heterodyning and amplitude detecting said carriers to produce a video output and a beat frequency carrier having a frequency equal to said fixed frequency difference and bearing said frequency modulation, means for amplifying said video output and said beat frequency carrier including an electron discharge tube having a cathode, an anode and a control electrode, and utilization means for the video signals coupled to the anode circuit of said tube: the combination therewith of a parallel resonant circuit tuned to said beat frequency, means connecting said parallel resonant circuit between said cathode and ground, whereby said beat frequency carrier is effectively separated from the video output of said tube, and means responsive to the frequency modulation of said beat frequency carrier but not to the amplitude modulation thereof coupled to said parallel resonant circuit and deriving the frequency modulation envelope of said beat frequency carrier.

2. In a television receiver for receiving television signals consisting of an amplitude modulated video signal carrier and a related frequency modulated audio signal carrier, the two carriers being separated by a substantially fixed frequency difference, said receiver including means heterodyning and amplitude detecting said carriers to produce a video output and a beat frequency carrier having a frequency equal to said fixed frequency difference and bearing said frequency modulation, means for amplifying said video output and said beat frequency carrier including an electron discharge tube having a cathode, an anode and a control electrode, and utilization means for the video signals coupled to the anode circuit of said tube: the combination therewith of a parallel resonant circuit tuned to said beat frequency, means connecting said parallel resonant circuit between said cathode and ground, whereby said beat frequency carrier is effectively separated from the video output of said tube and demodulation means responsive to frequency but not to amplitude variations inductively coupled to said parallel resonant circuit.

3. In a television receiver for receiving television signals consisting of an amplitude modulated video signal carrier and a related frequency modulated audio signal carrier, the two carriers being separated by a substantially fixed frequency difference, said receiver including means heterodyning and amplitude detecting said carriers to produce a video output and a beat frequency carrier having a frequency equal to said fixed frequency difference and bearing said frequency modulation, means for amplifying said video output and said beat frequency carrier including an electron discharge tube having a cathode, an anode and a control electrode, and utilization means for the video signals coupled to the anode circuit of said tube: the combination therewith of a parallel resonant circuit tuned to said beat frequency, said resonant circuit comprising an inductor and a capacitor in parallel, means connecting said resonant circuit between said cathode and ground, whereby said beat frequency carrier is effectively separated from the video output of said tube, demodulation means responsive to frequency but not to amplitude variations of said beat frequency carrier and transformer means coupling said demodulation means to said resonant circuit, the primary of said transformer means being constituted by said inductor.

4. In a television receiver for receiving television signals consisting of an amplitude modulated video signal carrier and a related frequency modulated audio signal carrier, the two carriers being separated by a substantially fixed frequency difference, said receiver including means heterodyning and amplitude detecting said carriers to produce a video output and a beat frequency carrier having a frequency equal to said fixed frequency difference and bearing said frequency modulation, means for amplifying said video output and said beat frequency carrier including an electron discharge tube having a cathode, an anode and a control electrode, and utilization means for the video signals coupled to the anode circuit of said tube: the combination therewith of a parallel resonant circuit tuned to said beat frequency, said parallel resonant circuit having two terminals, means connecting one of said terminals to said cathode and the other to ground, whereby said beat frequency carrier is effectively separated from the video output of said tube, and means responsive to the frequency modulation of said beat frequency carrier but not to the amplitude modulation thereof coupled to said parallel resonant circuit and deriving the frequency modulation envelope of said beat frequency carrier.

5. In a television receiver for receiving television signals consisting of an amplitude modulated video signal carrier and a related frequency modulated audio signal carrier, the two carriers being separated by a substantially fixed frequency difference, said receiver including means heterodyning and amplitude detecting said carriers to produce a video output and a beat frequency carrier having a frequency equal to said fixed frequency difference and bearing said frequency modulation, means for amplifying said video output and said beat frequency carrier including an electron discharge tube having a cathode, an anode and a control electrode, and utilization means for the video signals coupled to the anode circuit of said tube: the combination therewith of a resonant circuit tuned to said beat frequency, said resonant circuit comprising an inductor and a capacitor in parallel, means connecting said cathode with an intermediate point on said inductor, means grounding said resonant circuit, and demodulation means responsive to frequency but not to amplitude variations of said beat frequency carrier coupled to said resonant circuit and deriving the frequency modulation envelope of said beat frequency carrier.

EDWARD L. CROSBY, Jr.

References Cited in the file of this patent

UNITED STATES PATENTS

| Number | Name | Date |
|---|---|---|
| 2,210,497 | Percival | Aug. 6, 1940 |
| 2,299,390 | Holmes | Oct. 20, 1942 |
| 2,448,908 | Parker | Sept. 7, 1948 |
| 2,498,488 | Fyler | Feb. 21, 1950 |
| 2,504,662 | Dome | Apr. 18, 1950 |

FOREIGN PATENTS

| Number | Country | Date |
|---|---|---|
| 114,716 | Australia | Aug. 11, 1939 |

OTHER REFERENCES

"Radio and Television News," June, 1949, page 42.